May 22, 1951    L. B. KOONTZ    2,553,922
METALLIC STRUCTURE
Filed Dec. 20, 1944
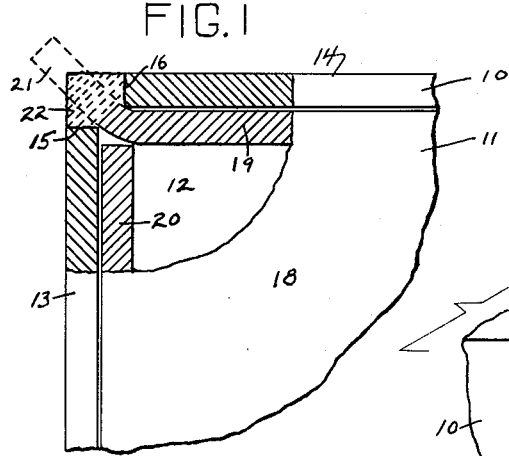
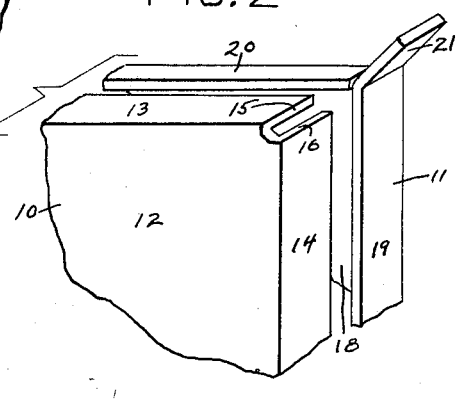
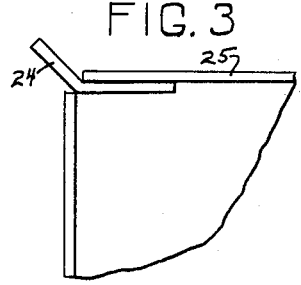
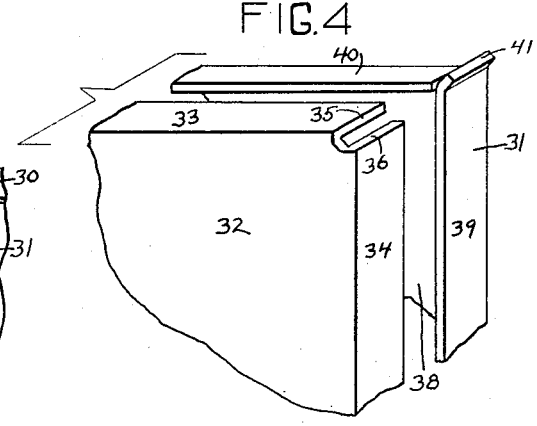
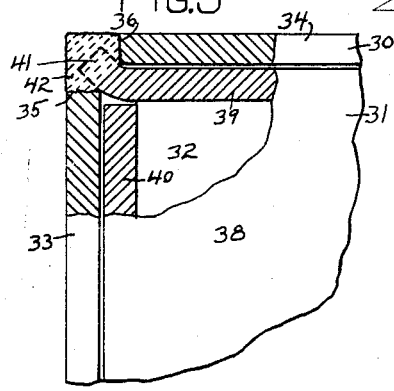
Leonard B. Koontz
INVENTOR Patented May 22, 1951

2,553,922

UNITED STATES PATENT OFFICE 2,553,922

METALLIC STRUCTURE

Lamont B. Koontz, Deer Lodge, Mont.

Application December 20, 1944, Serial No. 569,047

3 Claims. (Cl. 189—36)

The present invention relates to welded sheet metal structures.

In the making of various composite sheet metal structures, one of the most difficult problems is that of securing the parts together. Where possible, welding is a preferred method for joining the parts, but the welding of sheet metal involves special difficulties. Due to the thinness of the metal, one of the most prevalent problems is the securing of proper penetration and fusing with the parent metal without burning through the parts to be joined. As a specific instance, metal kitchen cabinet doors are conventionally made of two telescoped pans, each comprising a base or surface portion and angular flanges. After telescoping the pans together in space enclosing relation, the corner joints are welded by burning through the adjacent corner edges of the outer flanges sufficiently to reach the adjacent corner edges of the inner flanges so that all of the edges may be fused together. Preferably, the groove formed by the flange edges is then filled in with weld metal. The difficulty in this operation is the fusing of the outer flanges with the inner flanges without also burning through the inner flanges and forming a hole difficult to fill. Even at best, the groove or notch formed by the edges of the outer flanges is considerably widened by the welding operation, thus requiring painstaking filling or resulting in an unsightly and possibly inferior joint.

It is therefore an object of this invention to provide a welded joint for sheet metal structures which is strong and dependable, even when made by inexperienced welders.

It is a further object to provide a sheet metal joint structure which requires a minimum of preparation prior to welding and a minimum of finishing after the welding.

It is an additional object to provide a welded joint for sheet metal structures wherein the parts may be successfully welded without penetrating more than one thickness of metal.

It is an object to provide a joint for sheet metal structures wherein great strength is obtained by the interlocking relationship of the parts even though the weld quality be low.

It is another object to provide a welded joint for sheet metal structures which requires the fusing of a minimum amount of material to complete the joint.

It is also an object to provide a joint which is strong and easily made even though the parts being joined do not fit together as closely as desired.

It is a further object to provide a sheet metal structure comprising a pair of essentially concave members assembled in space enclosing relation with the connecting welded joints reenforcing the structure in a manner to prevent distortion.

It is also an object to provide a closure comprising a pair of telescoped pans wherein at least one of the corner joints is formed by a portion of the inner pan extending between parts of the outer pan, the joint being completed by welding.

These and other objects will be noted upon studying the following specification and the related drawings wherein:

Fig. 1 is an enlarged elevation view of a corner of a closure, parts being broken away to show the construction.

Fig. 2 is a perspective view of a corner of a closure joint just prior to assembly.

Fig. 3 is an elevation view of a modified inner member for a closure or the like.

Fig. 4 is a perspective view similar to Fig. 2 but showing a modified construction of the inner member.

Fig. 5 is an elevation view of the completed joint of the modification shown in Fig. 4, parts being broken away.

This application is a continuation in part of application Serial No. 478,579, filed March 9, 1943, now abandoned.

Figure 1 of the drawings illustrates a representative corner of a closure and shows one embodiment of the present invention. While only one corner of the closure is shown, it is of course obvious that each of the corners may, and preferably is, constructed in like manner. Figure 2 relates to the same closure but shows the parts prior to assembly. In these figures, the closure is formed by concave or pan-like members 10 and 11, member 11 being constructed sufficiently smaller than 10 so that it may be telescoped inside of 10. Member 10 comprises a base or web portion 12 and peripheral flanges 13 and 14 bent at right angles to said base portion. Flange 13 has an edge surface 15 and flange 14 includes an edge surface 16, said edge surfaces being outwardly divergent and spaced apart.

As before mentioned, member 11 is somewhat smaller than member 10. Member 11 includes a base or web portion 18 and peripheral flanges 19 and 20. Flange 19 includes an angularly bent or deformed tongue or projection 21 which is adapted to fit within the slot formed by edge surfaces 15 and 16 of member 10. Preferably, tongue 21 is long enough to provide enough metal, when fused, to fill in the groove defined by edge surfaces 15 and 16.

Upon assembling the closure, member 11 is telescoped inside of 10 with tongue 21 extending outwardly from the corner of member 10. The corner joint is then secured by fusing tongue 21 into engagement with edge surfaces 15 and 16. With proper care and if the tongue be long enough, the corner is built up of fused metal 22 from said tongue, thus forming an enlarged portion in fused engagement with surfaces 15 and 16 of flanges 13 and 14, respectively. The fusing may be accomplished in any suitable manner such as with a gas torch or a carbon arc. Obviously, flux may be used if needed. The joint is finished after welding by suitable grinding or the like to remove surplus metal and to improve the appearance.

An inspection of Figure 1 reveals that head or bead 22 of weld metal formed of and on tongue 21 coacts with outwardly divergent surfaces 15 and 16 in such manner that tongue 21 cannot be retracted through the slot formed by the edge surfaces. In addition, flanges 19 and 20 coact with the inner surfaces of flanges 13 and 14 so that member 11 and tongue 21 cannot shift in the opposite direction. Further, even if metal 22 does not intimately fuse with surfaces 15 and 16, these surfaces are usually roughened enough that disassembly becomes difficult.

In addition to the excellent corner joint structure thus described, it is noted that the closure as a whole is exceptionally strong and rigid due to the secure fastening of the members 10 and 11 at the corners and the intervening web or base portions 12 and 18 extending between said corners. It is noted that portions 12 and 18 may constitute inner and outer surfaces of the closure or either one or both of said portions may be suitably covered.

In Figure 3 it is noted that the tongue 24 may be a separate and suitably formed member attached, as by spot welding, to flange 25. This construction is considered an alternative way of constructing the inner member of a closure such as above discussed.

Figures 4 and 5 show a construction similar to that of Figures 1 and 2 but differing therefrom in that angularly disposed flange 41 extends beyond the innermost edges of edge surfaces 35 and 36 but does not extend beyond the corner defined by the edge surfaces. Except for its length, tongue 41 may be formed in the same manner as tongue 21, and may also be constructed as a separate member, as in Fig. 3. The various parts of this modified structure are numbered similarly to Figures 1 and 2 but with the exception that each of the aforesaid numbers has been increased by 20. A closure using this modified structure is formed and assembled in the same manner as that in Figures 1 and 2 with the exception that additional weld metal must be added to fill out the joint. While any conventional sort of welding is satisfactory, electric arc welding with a relatively small rod is preferred because the relatively small arc is readily controlled.

In this latter modification, it should be noted that the welding rod is able to engage flange 41 of the inner pan-like member without having to enlarge in the least the slot formed by surfaces 35 and 36. Without tongue 41 extending through the bottom of the slot in the manner shown, it will be seen that proper fusion with inner member 31 would be practically impossible without widening the slot formed by surfaces 35 and 36.

Because the arc from a welding rod may go sideways as readily as downward when working in a deep and narrow groove, the ease in welding caused by bringing portion 41 of the inner member 31 out where it can be readily reached by the arc, as in this modification, is readily apparent. In addition, the joint formed by this modification has the merits of exceptional strength due to mechanical interlock even if the weld quality is low, as above described.

In studying the present specification and drawings, alternatives and substitutions may become apparent to those skilled in the art, hence the scope of the present invention is to be determined only by the appended claims.

I claim:

1. A sheet metal closure comprising two shallow pans each having a base portion and peripheral flanges, the flanges of one pan being spaced apart at the corners, the adjacent edge surfaces of said flanges being in outwardly diverging relation, the second pan having a tongue attached to a flange at each corner, said second pan being telescoped inside the first named pan with the tongues extending between the innermost edges of said surfaces, said tongues being welded to said diverging edge surfaces.

2. In a sheet metal closure, two telescoped pan-like members, each member having a base portion and peripheral flanges, the flanges of the outer pan being spaced apart at a corner, and a portion of a flange of the inner member extending between and in contacting relation with said spaced flanges, said extending portion being welded to said spaced apart flanges.

3. A sheet metal closure comprising two shallow pans each having a base portion and peripheral flanges, at least one pair of flanges of one pan being spaced apart at a corner, the adjacent edge surfaces of said flanges being in outwardly diverging relation, the second pan having an outwardly extending tongue attached to a flange at a corner, said second pan being telescoped inside the first named pan with the tongue extending between the innermost edges of said outwardly diverging surfaces, said tongue being welded to said edge surfaces.

LAMONT B. KOONTZ.

REFERENCES CITED

The following references are of record in the file of this patent:

UNITED STATES PATENTS

| Number | Name | Date |
| --- | --- | --- |
| 1,313,387 | Kaarbo | Aug. 19, 1919 |
| 1,364,626 | Ewertz | Jan. 4, 1921 |
| 1,484,579 | Still | Feb. 19, 1924 |
| 1,486,607 | Reissig | Mar. 11, 1924 |
| 1,764,585 | Taylor | June 17, 1930 |
| 1,946,494 | Horton | Feb. 13, 1934 |
| 2,145,937 | Lockwood | Feb. 7, 1939 |
| 2,228,609 | Ragni | Jan. 14, 1941 |
| 2,297,040 | Weening | Sept. 29, 1942 |
| 2,352,754 | Anderson et al. | July 4, 1944 |

OTHER REFERENCES

The Welding Encyclopedia, 7th edition, 1930, publ. by The Welding Eng. Pub. Co., Chicago, Ill., pages 450 and 451.

Procedure Handbook of Arc Welding Design and Practice, 7th edition, June 1942. Publ. by the Lincoln Electric Co., Cleveland, Ohio, page 321.